United States Patent [19]

Tran et al.

[11] Patent Number: 4,857,341
[45] Date of Patent: Aug. 15, 1989

[54] PROTEIN-FREE COFFEE WHITENER AND METHOD OF MAKING SAME

[75] Inventors: Kha M. Tran, Simi Valley; Mark A. Einerson, Valencia, both of Calif.

[73] Assignee: Nestec S.A., Vevey, Switzerland

[21] Appl. No.: 766,477

[22] Filed: Aug. 19, 1985

[51] Int. Cl.$^4$ ............................................. A23C 11/02
[52] U.S. Cl. ..................................... 426/98; 426/601; 426/613; 426/658
[58] Field of Search ................. 426/98, 601, 613, 658

[56] References Cited

U.S. PATENT DOCUMENTS

| | | |
|---|---|---|
| 2,861,891 | 11/1958 | Bancrafeind et al. . |
| 2,913,342 | 11/1959 | Cameron et al. . |
| 3,023,106 | 2/1962 | Common . |
| 3,295,986 | 1/1967 | Saslaw et al. ........................... 426/98 |
| 3,514,298 | 5/1970 | Noznick et al. ................. 426/613 X |
| 3,563,761 | 2/1971 | Ellinger . |
| 4,045,589 | 8/1977 | Petrowski et al. . |
| 4,242,364 | 12/1980 | Buddemeyer et al. .............. 426/613 |
| 4,407,838 | 10/1983 | Rule et al. ........................... 426/602 |
| 4,460,617 | 7/1984 | Barndt et al. ........................ 426/609 |

OTHER PUBLICATIONS

Encyclopedia of Food Technology, Avi Publishing Co. Inc., 1974, pp. 489–496.

*Primary Examiner*—Donald E. Czaja
*Assistant Examiner*—Celine T. Callahan

[57] ABSTRACT

A spray dried, non-dairy coffee whitener is prepared without the use of protein by incorporating a water soluble, film-forming hydrocolloid in the formulation. The hydrocolloid, such as gum arabic, when added to an aqueous, fat-containing emulsion concentrate, stabilizes the emulsion through the spray drying step so that when the dried emulsion concentrate is reconstituted in coffee a stable emulsion is formed which effectively whitens the coffee.

6 Claims, No Drawings

PROTEIN-FREE COFFEE WHITENER AND METHOD OF MAKING SAME

BACKGROUND OF THE INVENTION

This invention relates to a dried non-dairy fat emulsion product suitable for use as a coffee whitener and to the method of producing the product. More particularly, the invention relates to a protein-free dried fat emulsion product which when reconstituted in an aqueous media, such as coffee or tea, forms a stable fat emulsion to effectively whiten the beverage.

Dry, non-dairy coffee whiteners are well-known in the food industry. In preparing such products, various ingredients such as carbohydrate, fat, protein, emulsifier, stabilizing salt, and the like are dissolved and/or dispersed in water and homogenized to provide a liquid emulsion concentrate having a solids content of about 45–70%, and the liquid emulsion concentrate thus formed is spray dried to a moisture content of no more than 5%. The dried product when added to an aqueous media such as coffee or tea forms a reconstituted oil-in-water emulsion which whitens and flavors the beverage. A typical formulation, on a dry weight basis, for a spray-dried coffee whitener is as follows:

| | |
|---|---|
| Vegetable fat | 20–40% |
| Carbohydrate (e.g. corn syrup solids, sucrose) | 50–75% |
| Protein (e.g. sodium caseinate) | 2–6% |
| Stabilizing salt (e.g. dipotassium phosphate) | 1–3% |
| Emulsifier (e.g. mono- and diglycerides, propylene glycol monostearate, etc.) | 0.5–2.0% |
| Color | q.s. |
| Flavor | q.s. |
| Anti-caking agent | q.s. |

In such dry coffee whitener formulations, the vegetable fat or oil provides whitening effect, body and viscosity. The carbohydrate acts as a carrier for the fat to retard coalescence of the fat and provides some sweetness effect. Emulsifiers are incorporated in the formulation to maintain the fat globules in dispersion when the emulsion concentrate is prepared. The protein, usually sodium caseinate, has been found to be necessary to stabilize the emulsion through the drying step so that when the dried product is reconstituted in coffee, a stable emulsion is provided. In formulations which contain protein, it is also common to include in the product stabilizing salts such as phosphate and citrate salt to improve the colloidal solubility of the protein and reduce the tendency toward feathering.

While the use of protein in the formulation gives stability to the emulsion through the drying step and excellent whitening power to the product, it is disadvantageous in some respects. For example, dried coffee whiteners containing sodium caseinate exhibit feathering in coffee under certain conditions, such as when the water used in making the coffee has a high calcium or magnesium ion content, or when the coffee is very acidic. Moreover, while sodium caseinate is legally defined to be non-dairy, its inclusion in the whitener formulation makes the product unacceptable to some ethnic groups. The use of other water dispersible proteins, such as soy protein, has been less than satisfactory due to off-flavors, feathering of the protein in coffee and other problems.

In recent years there have been a number of attempts to develop commercially acceptable coffee whiteners which are protein-free. The following patents are representative of prior art attempts to produce such a product: U.S. Pat. Nos. 3,563,761 to Ellinger; 4,045,589 to Petrowski et al., 4,407,838 to Rule et al.; 4,460,617 to Barndt et al., and 4,242,364 to Buddemeyer et al. These prior art efforts have not been entirely successful in providing a commercially acceptable coffee whitener due to the off-flavors, feathering of the protein in coffee, fat separation, poor whitening properties, and other problems.

SUMMARY OF THE INVENTION

It has now been discovered that a dried fat emulsion product having excellent stability and coffee whitener characteristics can be prepared without the use of protein by incorporating a water soluble film-forming hydrocolloid in the liquid emulsion concentrate from which the product is prepared. The film-forming hydrocolloid, when included in the liquid emulsion concentrate, encapsulates the fat globules and serves to stabilize the emulsion through the spray drying step and prevents coalescence of the fat when the dried emulsion concentrate is reconstituted upon addition to coffee. Thus, the protein-free product of this invention, upon reconstitution, disperses easily in liquids with no sign of fat "oiling off" or emulsion instability, and is effective in whitening coffee.

The film-forming hydrocolloid is effective in stabilizing the fat globules through the spray drying step even when present in the liquid emulsion concentrate in only relatively small amounts. However, when the weight ratio of hydrocolloid to fat in the liquid emulsion concentrate is less than about 0.1:1, the amount of carbohydrate used should be sufficient to provide the liquid emulsion concentrate with a viscosity of at least about 50 cps (as measured by a Brookfield Digital Viscometer, cone-plate assembly, at 20 rpm at 60° C.) in order to maintain good emulsion stability when the dried whitener is reconstituted.

In producing the product of this invention, a liquid emulsion concentrate containing as essential ingredients water, vegetable fat or oil, a stabilizing amount of a water soluble film-forming hydrocolloid, and a viscosity-increasing amount of carbohydrate, is prepared, homogenized and spray dried. Additional ingredients which may be incorporated in the product include flavor, color, anti-caking agents and, optionally, a conventional emulsifier to further enhance the whitening effect of the product in coffee.

DETAILED DESCRIPTION OF THE PRESENT INVENTION

More specifically, the product of the present invention is a dry, stable, protein-free fat emulsion product which is provided by forming a liquid emulsion concentrate containing a major portion by weight of a carbohydrate, together with a fat or oil encapsulated by and stabilized with a water soluble, film-forming hydrocolloid, and spray drying the liquid emulsion concentrate.

A wide variety of edible fats or oils may be used in the present invention. The fat or oil may be of animal or vegetable source, but should have a bland or neutral flavor and long term stability towards oxidation and the development of rancidity. Generally, it is preferred to use fats with a melting point in the range of about 110° F.–115° F. so that a major portion of the triglycerides content of the fat will remain in the solid state at the maximum temperatures usually encountered in handling, shipping and storage of the coffee whitener. Fats and oils which may be used include partially or fully hydrogenated vegetable fats and oils such as, for example, cottonseed oil, coconut oil, corn oil, soybean oil, peanut oil, sunflower oil, palm kernel oil, and the like, including mixtures thereof, tallow and lard. The amount of fat or oil in the dried product may vary from about 15% to 50% by weight, with levels of between 20% to 40% by weight of the dried product being preferred.

As noted above, protein has heretofor been considered to be an essential ingredient in dried coffee whiteners. It has now been found that a stable dry coffee whitener having excellent whitening characteristics when reconstituted in coffee can be prepared without the use of protein by incorporating in the liquid emulsion concentrate a relatively small amount of a water soluble, film-forming hydrocolloid. The hydrocolloid, when included in the liquid emulsion concentrate, encapsulates the fat globules and stabilizes the emulsion through spray drying. In addition, when the dried product is reconstituted in coffee, the presence of the hydrocolloid provides a stable emulsion which effectively whitens the coffee with no sign of oiling off, feathering or other sign of emulsion instability.

Water soluble hydrocolloids with good film-forming or encapsulation properties which may be used in the present invention include gum arabic, propylene glycol alginate, hydroxypropyl cellulose, mixtures of microcrystalline cellulose and carboxymethyl cellulose, and combinations thereof. Such hydrocolloids are effective in providing a stable, protein-free coffee whitener when incorporated in the liquid emulsion concentrate in an amount of at least about 0.04 parts by weight of hydrocolloid per one part by weight of the fat in the emulsion concentrate. Even at such low levels, the film-forming hydrocolloid is effective in stabilizing the liquid emulsion concentrate through spray drying and providing a dry coffee whitener having good emulsion stability when reconstituted in coffee. Greater amounts of the hydrocolloid may, of course, be used. However, the amount of hydrocolloid used should not be so great as to adversely affect the taste and flavor of the whitener.

Gum arabic is generally preferred as the film-forming hydrocolloid in the present invention. Gum arabic is particularly advantageous because of its ready solubility in water and its excellent film-forming characteristics on oily surfaces. Preferably the amount of gum arabic used is sufficient to provide a hydrocolloid to fat ratio (by weight) in the liquid emulsion concentrate of at least 0.1:1. At a level of more than about 0.7 parts by weight of gum arabic to 1 part by weight of fat in the emulsion concentrate, the taste and flavor of the resulting dried whitener may be adversely affected. A ratio of from 0.14–0.20 parts by weight of gum arabic to 1 part by weight of fat in the liquid emulsion concentrate is particularly preferred in the production of a coffee whitener having a combination of desirable characteristics, namely, emulsion stability, whitening, flavor and mouthfeel.

The film-forming hydrocolloids other than gum arabic which may be used in the present invention are effective in producing a satisfactory whitener when used at approximately the same levels as gum arabic. However, since the taste and flavor of such hydrocolloids may differ, the upper limit of the hydrocolloid which may be used may differ somewhat, and should be maintained at a level below which the taste of the whitener is adversely affected.

A water soluble carbohydrate is included in the emulsion concentrate to impart flavor and improved body to the dried coffee whitener, and to act as a carrier for the fat. Any of the carbohydrates which are typically used in dried coffee whiteners may be used in the present invention, including for example, corn syrup solids, sucrose, fructose, lactose, and mixtures thereof. Preferably, corn syrup solids is used as the carbohydrate.

Generally, the carbohydrate comprises a major portion by weight of the dried whitener, with the carbohydrate being present in an amount of from 50% to 70% by weight of the dried whitener. When the liquid emulsion concentrate contains a hydrocolloid to fat ratio (by weight) of less than about 0.1:1, the dried concentrate, upon reconstitution in coffee, may exhibit emulsion instability, with separation of fat globules in the coffee. It has been found that when the hydrocolloid to fat ratio in the liquid emulsion concentrate is less than about 0.1:1, such emulsion instability can be avoided by including in the liquid emulsion concentrate sufficient carbohydrate to provide the liquid emulsion concentrate with a viscosity of at least about 50 cps (Brookfield viscosity at low shear rate at 60° C.). Such a viscosity for the liquid emulsion concentrate can be provided by using a relatively high level of corn syrup solids in the liquid emulsion concentrate, with the corn syrup solids being present at a level of at least 1.75 parts by weight per 1 part by weight of fat in the concentrate. Such a viscosity-increasing level of corn syrup solids in the liquid emulsion concentrated enables a low hydrocolloid to fat ratio to be used, by reducing the ratio of aggregation and coalescence of fat particles when the dried emulsion concentrate is reconstituted upon addition to coffee. Consequently, the dried whitener prepared from a liquid emulsion concentrate, which contains such a low level of hydrocolloid and a viscosity-increasing amount of corn syrup solids, will not exhibit emulsion instability when reconstituted upon addition to coffee. Of course, when the weight ratio of hydrocolloid to fat in the liquid emulsion concentrate is above about 0.1:1, such a viscosity-increasing amount of carbohydrate in the emulsion concentrate is not required.

In addition to the above ingredients, other conventional ingredients commonly used in the production of coffee whiteners may also be used in the whitener of the present invention. For example, flavorants such as butter or cream flavoring agents, and colorants such as titanium dioxide, may be included in the emulsion concentrate. Optionally, conventional emulsifiers such as mono- and diglycerides, glycerol monostearates, sorbitan esters of fatty acids, and the like may be included in the liquid emulsion concentrate in amounts of from 0.8% to 3.0% by weight, to further enhance the whitening effect of the product. Such emulsifiers further promote the formation an stability, prior to drying, of finely divided fat globules responsible for the whitening effect of the reconstituted emulsion. Conventional buffering salts, such as disodium phosphate, and anticaking agents, such as sodium silico-aluminate, may be blended into the dried emulsion concentrate.

In preparing the product of this invention, a liquid emulsion concentrate is formed by dissolving and/or dispersing the various dry ingredients in just enough hot water (150° F.–200° F.) to maintain the solids in solution or dispersion and provide sufficient fluidity to the concentrate so that it may be pumped. Preferably the solids content of the emulsion concentrate is in the range of about 55%–75%, with a solids content of at least 60% being preferred when the ratio of hydrocolloid to fat in the liquid emulsion concentrate is less than about 0.14:1. Fat, which has been heated to about 130° F.–140° F. so that it is in a liquid state, is added, with agitation, to the aqueous phase which is then homogenized, such as at 2,000–4,000 pounds total pressure in a two-stage homogenizer, to provide a stable emulsion concentrate in which the fat globules average about 1–3 microns in diameter. This liquid emulsion concentrate is then spray dried under conditions such that the dried product has a moisture content of no more than about 5%. If desired, the emulsion concentrate may then be instantized by agglomerating the powder to make it more dispersible.

The following examples are given to further illustrate, not to limit, the invention. All parts and percentages are by weight unless otherwise indicated.

EXAMPLE I

A stable, spray dried, protein-free coffee whitener is prepared from a liquid emulsion concentrate containing the following ingredients:

| Ingredient | % by wt. |
| --- | --- |
| Vegetable fat (hydrogenated coconut oil) | 21 |
| Carbohydrate (corn syrup solids) | 37 |
| Film-forming hydrocolloid (gum arabic) | 3 |
| Water | 39 |
| Flavour and color | q.s. |

The dry ingredients, namely, corn syrup solids, gum arabic, flavor and color are added, with agitation, to hot water (180° F.–190° F.). Liquified fat, at a temperature of about 160° F. is then added, with agitation, to this aqueous phase, which is then homogenized in a two-stage homogenizer at about 2500/500 psi to completely emulsify the fat and form a stable emulsion concentrate having a solids content of 61% and a Brookfield viscosity of 64 cps at 60° C. The liquid emulsion concentrate is then spray dried to a moisture content of 1%–3%, mixed with a small amount of anticaking agent, and instantized according to conventional procedures. The powdered whitener produced by this procedure contains 0.14 parts by weight of hydrocolloid per part by weight of fat. The product disperses readily in coffee and provides excellent whitening with no sign of fat "oiling off" or emulsion instability, and has a flavor comparable to conventional commercial whiteners.

EXAMPLE II

A liquid emulsion concentrate having the following formulation is prepared in accordance with the procedure of Example I.

| Ingredient | % by wt. |
| --- | --- |
| Vegetable fat (hydrogenated coconut oil) | 21 |
| Carbohydrate (corn syrup solids) | 37 |
| Film-forming hydrocolloid (gum arabic) | 2 |
| Water | 40 |
| Flavour and color | q.s. |

The emulsion concentrate thus prepared has a solids content of 60% and a Brookfield viscosity at 50 cps (at 60° C.), and is homogenized and spray dried as in Example I. The resulting dried product has a ratio of hydrocolloid to fat of about 0.1:1, and upon addition to coffee, effectively whitens the coffee with no feathering or free fat.

EXAMPLE III

In order to demonstrate the effectiveness of a water soluble, film forming hydrocolloid other than gum arabic in the present invention, a spray-dried, protein-free coffee whitener is prepared according to the procedure of Example I, with the liquid emulsion concentrate having the following formulation in which propylene glycol alginate is used as the film-forming hydrocolloid:

| Ingredient | % by wt. |
| --- | --- |
| Hydrogenated coconut oil | 21 |
| Corn syrup solids | 37 |
| Propylene glycol alginate | 1 |
| Water | 41 |
| Flavour | q.s. |

The resulting dried product, when added to coffee, gives excellent whitening in coffee, and readily dispersed in coffee with no feathering or free fat.

Similar results are obtained when a combination of gum arabic and propylene glycol alginate or other film-forming hydrocolloids of this invention, at a ratio of 1:1, is used in the formulation and procedure of Example I, at a total level of 2% in the formulation.

EXAMPLE IV

The procedure of Example I is repeated with the exception that sucrose is used in the formulation in place of corn syrup solids, with the sucrose constituting 37% by weight of the liquid emulsion concentrate. The liquid emulsion concentrate thus formed has a solids content of 61% and a Brookfield viscosity at 30 cps at 60° C. When the dried product produced from such emulsion concentrate is added to coffee, it tends to separate into a lower darker layer and an upper lighter layer, which is indicative of separation of fat globules in the low viscosity solution. As disclosed hereinabove, when the ratio of hydrocolloid to fat in the emulsion concentrate is less than about 0.14:1, the amount of carbohydrate used must be sufficient to provide the emulsion concentrate with a viscosity of at least about 50 cps at 60° C., in order to maintain good emulsion stability when the whitener is reconstituted.

Thus, the use of the water soluble, film-forming hydrocolloids disclosed hereinabove is effective in providing a stable, protein-free coffee whitener which contains as its essential ingredients, vegetable fat or oil and carbohydrate in addition to the hydrocolloid.

In accordance with another embodiment of this invention, the film-forming hydrocolloids disclosed above may also be used to improve the stability of dried protein-free coffee whiteners which contain a starch derivative as an essential ingredient. Thus, U.S. Pat.

Nos. 4,045,589 to Petrowski et al, and 4,460,617 to Barndt et al, disclose the use of a chemically modified starch derivative in the production of a protein-free whitener. The disclosures of these patents are incorporated herein by reference. It has been found that the stability and whitening effect of coffee whiteners containing such a starch-derivative can be improved by incorporating a film-forming hydrocolloid of the present invention together with the starch derivative in the production of the whitener. Thus, the hydrocolloid is added, together with the other ingredients, to the emulsion concentrate of the 4,460,617 and 4,045,589 patents as a partial replacement for the starch derivative. From about 20% to about 65% by weight of the starch derivative used in the production of the protein-free whitener of these prior patents may be replaced with one or more of the film-forming hydrocolloids of the present invention, with the most significant improvement in whitening occurring when from about 40% to about 55% of the starch derivative to be used is replaced by a film-forming hydrocolloid of the present invention. For example, in the production of the whitener disclosed in the 4,045,589 patent, a liquid emulsion concentrate is formed which contains an edible fat or oil, carbohydrate, an emulsifier, a chemically modified dextrinized starch having a lipophilic character, a film-forming hydrocolloid, specifically gum arabic and water, with the gum arabic and starch derivative together constituting about 5% by weight of the solids content of the emulsion concentrate. The liquid emulsion concentrate thus formed is spray dried using conventional procedures to provide a dried whitener. A weight ratio of gum arabic to chemically modified dextrinized starch of from about 1:4 to 3.25:1.75 in the emulsion concentrate is effective in stabilizing the emulsion through spray drying and provides a coffee whitener which has a greater whitening effect than one produced using the dextrinized starch alone. Thus, the combination of the film-forming hydrocolloid and the chemically modified dextrinized starch is not only effective in maintaining a stable emulsion subsequent to drying of the liquid emulsion concentrate, but such a combination is effective in producing a protein-free coffee whitener having improved whitening characteristics.

What is claimed is:

1. A dry protein-free coffee whitener comprising a spray dried emulsion concentrate consisting essentially of a major proportion by weight of carbohydrate, and finely divided particles of an edible fat encapsulated with gum arabic which is present in an amount of from 0.14 to 0.20 parts by weight of gum arabic per 1 part by weight of fat to provide a stable emulsion when the dry whitener is reconstituted in coffee.

2. A dry protein-free coffee whitener comprising a spray dried emulsion concentrate consisting essentially of a major proportion by weight of corn syrup solids, and finely divided particles of an edible fat encapsulated with a water soluble film-forming hydrocolloid selected from the group consisting of gum arabic, propylene glycol alginate, hydroxypropyl cellulose, a mixture of microcrystalline cellulose and carboxymethyl cellulose, and combinations thereof, with the ratio of said fat to said hydrocolloid being in the range of about 0.04 to 0.7 parts by weight of hydrocolloid per part by weight of the fat to provide a stable fat emulsion when the dry whitener is reconstituted in coffee, and the corn syrup solids being present in an amount of at least 1.75 parts by weight of corn syrup solids per 1 part by weight of fat when the hydrocolloid to fat ratio is less than 0.1:1.

3. A method of preparing a stable, dry protein-free coffee whitener which comprises
forming an emulsion concentrate consisting essentially of a major proportion of carbohydrate, a liquified fat, gum arabic and water, with the gum arabic being present in the emulsion concentrate in an amount from 0.14 to 0.20 parts by weight per 1 part by weight of fat,
homogenizing the emulsion concentrate to provide an emulsion of fat particles in water, with the fat particles being encapsulated with the gum arabic, and
spray drying the emulsion concentrate to a moisture content of no more than about 5%.

4. A method of preparing a stable, dry protein-free coffee whitener which comprises
forming an emulsion concentrate consisting essentially of a major proportion of corn syrup solids, a liquified fat, a water soluble film-forming hydrocolloid and water, with the emulsion concentrate having a weight ratio of said hydrocolloid to said fat in the range of between 0.04–0.7:1, and the corn syrup solids being present in the emulsion concentrate in an amount sufficient to provide the concentrate with a viscosity of at least 50 cps at 60° C. when the hydrocolloid to fat ratio in the emulsion concentrate is less than 0.1:1,
homogenizing the emulsion concentrate to provide an emulsion of fat particles in water, with the fat particles being encapsulated with said hydrocolloid, and
spray drying the emulsion concentrate to a moisture content of no more than about 5%.

5. The method defined in claim 4 in which said viscosity is provided by including in the emulsion concentrate at least 1.75 parts by weight corn syrup per 1 part by weight of fat.

6. The method of stabilizing a liquid emulsion concentrate consisting essentially of vegetable fat or oil, carbohydrate, and water, through spray drying which comprises
incorporating in said liquid emulsion concentrate a water soluble, film-forming hydrocolloid selected from the group consisting of gum arabic, propylene glycol alginate, hydroxypropyl cellulose, a mixture of microcrystalline cellulose and carboxymethyl cellulose, and combinations thereof, in an amount of from about 0.04 to 0.7 parts by weight of said hydrocolloid per part by weight of vegetable fat or oil, with the carbohydrate being present in the emulsion concentrate in an amount sufficient to provide the concentrate with a viscosity of at least 50 cps at 60° C. when the hydrocolloid to fat ratio in said concentrate is less than 0.1:1, homogenizing said emulsion concentrate, and spray drying said emulsion concentrate.

* * * * *

UNITED STATES PATENT OFFICE
CERTIFICATE OF CORRECTION

PATENT NO. : 4,857,341
DATED : August 15, 1989
INVENTOR(S) : Kha M. Tran and Mark A. Einerson It is certified that error appears in the above-identified patent and that said Letters Patent is hereby corrected as shown below:

Column 1, line 51, the word "salt", second occurance, should read "salts".

Column 3, line 19, the words "The hydrocolloid.", first occurance should be deleted.

Column 4, line 33, the word "ratio", second occurance, should read "rate".

Column 5, line 14, the word "dried" should precede the word "emulsion".

Column 7, line 43, the word "producing" should read "providing".

Column 5, line 41, the word "ina" should read "in a".

Signed and Sealed this

Fourteenth Day of August, 1990

Attest:

HARRY F. MANBECK, JR.

*Attesting Officer*          *Commissioner of Patents and Trademarks*